March 22, 1932.   W. JOSSELYN   1,850,460
CAMERA
Filed May 7, 1929
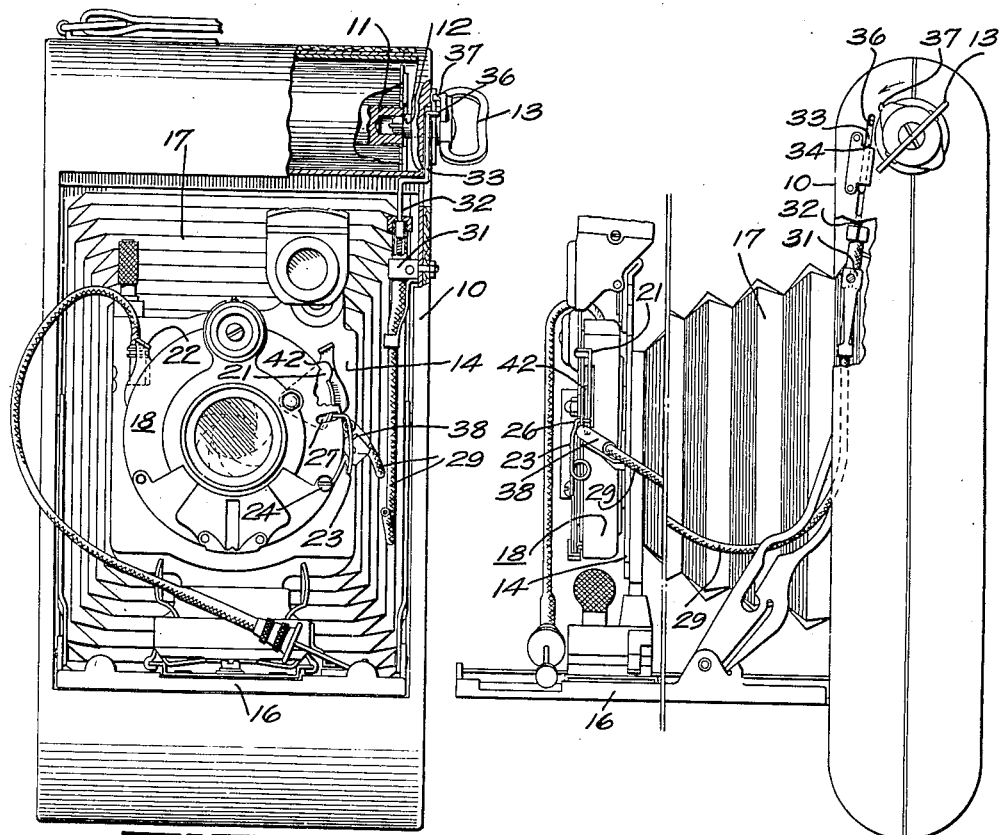
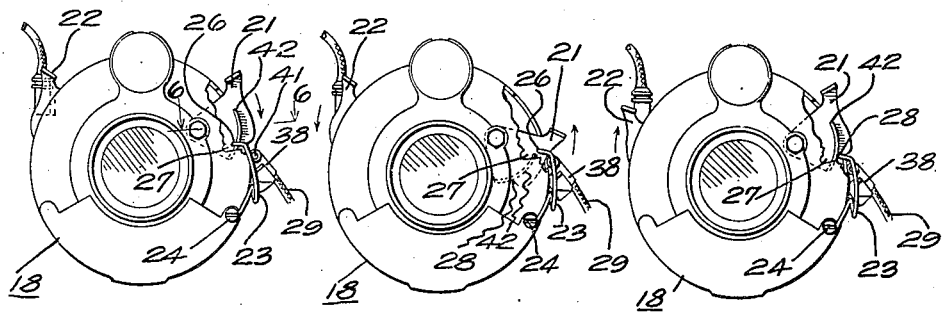
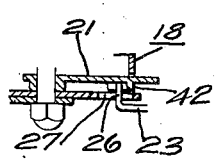
INVENTOR:
Winsor Josselyn
BY White, Prost & Fryer
ATTORNEYS.

Patented Mar. 22, 1932

1,850,460

UNITED STATES PATENT OFFICE

WINSOR JOSSELYN, OF CARMEL, CALIFORNIA

CAMERA

Application filed May 7, 1929. Serial No. 361,108.

This invention relates generally to the construction of cameras, and particularly cameras of the portable type used by the general public in taking snap shots or time exposures.

It is an object of this invention to devise a specific species or modification of the generic invention disclosed in my copending application Ser. No. 355,879, filed April 17, 1929 and entitled "Camera".

It is a further object of this invention to devise novel means applicable to a camera shutter mechanism having one member movable for setting the shutter mechanism and another member movable for effecting its release, whereby the first member is rendered inoperable under certain conditions to prevent the taking of a double exposure.

It is a further object of this invention to devise novel means actuated upon rotation of a member for moving the film of a camera, whereby locking mechanism in conjunction with the camera shutter is automatically released.

Further objects of the invention will appear from the following description in which I have set forth the preferred embodiment of my invention. It is to be understood that the appended claims are to be accorded a range of equivalents consistent with the state of the prior art.

Referring to the drawings:

Figure 1 is a front elevational view illustrating a camera incorporating my invention.

Fig. 2 is a side elevational view of a camera and associated structures shown in Fig. 1.

Fig. 3 is a detail of a shutter mechanism utilized in the camera of Figs. 1 and 2, with the associated locking means in released condition.

Fig. 4 is a detail similar to Fig. 3, but showing the shutter setting lever in a different operating position.

Fig. 5 is a detail similar to Fig. 3, illustrating the shutter setting lever in its normal position and locked against taking a double exposure.

Fig. 6 is a cross-sectional detail taken along the line 6—6 of Fig. 3.

In my aforementioned pending application Ser. No. 355,879 I have disclosed a camera construction designed to positively prevent the taking of double exposures. This is accomplished by rendering the shutter mechanism inoperable to effect a double exposure, after each operation of the shutter to expose a film portion. When an exposed film portion is manually replaced by an unexposed portion, suitable means serves to automatically release the shutter for taking a new exposure. The generic idea disclosed in said application is applicable to a variety of cameras, although the specific means disclosed is adapted particularly for use with shutter mechanisms having a single lever which is depressed for releasing the shutter and is released to return to normal position. In this application I have disclosed specific means whereby the invention of said application Ser. No. 355,879 can be applied to shutter mechanisms having two operating members, one of which is moved for tensioning or setting the shutter mechanism, and the other which is moved to effect release.

Thus referring to the drawings, I have disclosed a representative form of portable camera consisting of a body member 10 or film holder, which is constructed to provide a chamber for receiving a sensitized film. In cameras of this type, the film is in the form of a relatively long flexible strip, portions of which are exposed successively. Means is provided so that the operator can move the film strip to replace an exposed portion with an unexposed portion, after the taking of each exposure. Thus with the camera illustrated, the film strip is wound in the form of a roll positioned at one end of the camera body 10, and as the film is used, it is rolled or wound up upon a spool 11 positioned at the other end of the body. A spindle or shaft 12 is journaled to body 10 and engages spool 11, whereby upon rotation of the ring 13 fixed to spindle 12, the spool 11 is rotated to roll up the film.

The shutter mechanism is generally carried by an upstanding plate 14, which when the camera is in use, is generally adjustably supported by the hinged door 16. A bellows 17 connects plate 14 with the body 10, and together with the body, forms the dark space for the camera. The shutter mechanism is enclosed within a suitable casing secured to plate 14, and has been indicated generally at 18.

The particular shutter mechanism shown is of the type which is provided with a member 21, in the form of a manually operable lever, which is depressed by the operator from a normal to a second position, to tension a spring within the shutter mechanism. In addition to lever 21, there is another manually operable member 22 in the form of a lever which can be depressed at any time after the shutter is set, to release the shutter. Member 22 is generally biased by means of a spring to return to normal position after a complete exposure has been made. Lever 21 may be biased to return to normal position immediately after setting of the shutter mechanism, or it may remain in depressed condition until after the shutter has been released. In any event it returns to normal position after a complete shutter operation.

While locking mechanism may be employed in conjunction with lever 22, in the manner disclosed in said copending application, I have found it preferable to utilize such locking mechanism or equivalent means in conjunction with lever 21. The particular locking mechanism which I have shown consists of a latch member 23 made of resilient material, as for example a length of spring wire, suitably mounted to the shutter casing as by means of screw 24. The free end of latch 23 is provided with an inturned or laterally bent portion 26, adapted to project thru a slot 27 provided in the casing of the shutter mechanism 18. When latch 23 is in locked condition, with the lever 21 in raised or normal position, portion 26 engages with an aperture or slot 28 provided in lever 21, as shown in Fig. 5. It is evident that when in such locked condition, lever 21 cannot be depressed to set the shutter mechanism.

For releasing latch 23, I preferably provide means automatically operable upon rotation of spindle 12. Thus I have shown a flexible motion transmitting cable or device 29 inter-connecting spindle 12 with the shutter mechanism. This motion transmitting device can be similar to devices commonly used on cameras for releasing shutter mechanisms, and can consist for example of a flexible tube or casing slidably enclosing a flexible motion transmitting member. At one end of device 29, the flexible casing is rigidly secured to the camera body 10 by means of a suitable clamp 31. Slidable actuating pin 32 projecting from that end of device 29 is provided with an offset portion 33, which in turn is slidably disposed within a slot 34, this slot being formed in one side of body 10 adjacent to the spindle 12. Portion 33 is provided with a laterally bent finger 36 which is adapted to be engaged by a lug 37, rotatable together with spindle 12. Therefore upon rotation of spindle 12 by manual engagement with ring 13 to wind up the film strip, during each revolution of spindle 12 lug 37 engages finger 36 to move the same a certain amount, thus forcing actuator pin 32 into the device 29, after which lug 37 escapes by the finger.

The other end of flexible motion transmitting device 29 is mounted upon plate 14, as by means of bracket 38. The projecting thrust pin 41, is adapted to abut the inner side of latch 23. Therefore upon movement of actuator pin 32 responsive to rotation of spindle 12, thrust pin 41 is forced outwardly to lift latch 23 from notch 28. The construction of cable 29 is such that actuator pin 32 is spring biased toward projected position while thrust pin 41 is biased toward retracted position. Thrust pin 41 is preferably inclined with respect to the axis of movement of lever 21 as shown, so that in addition to lifting latch 23 from notch 28, it displaces this latch laterally, so that when the latch is released, it engages the side of a guiding ridge 42 or equivalent means formed upon the face of lever 21. Latch 23 is therefore retained in released condition, as shown in Fig. 3, in which portion 26 engages the left side of ridge 22. Further rotation of spindle 12 causing further actuation of pin 32, cannot again cause the latch 23 to be reconditioned to engage notch 28.

As previously explained, before making an exposure it is necessary for the operator to first depress lever 21 from a normal to a second or depressed position, to tension and cock a resilient element of the shutter mechanism and thus place the mechanism in set condition. While lever 21 is being depressed, latch 23 is guided by ridge 22 until the shutter mechanism is set, after which latch 23 is free to pass across the upper end of ridge 22. The position of lever 21 relative to latch 23 when the lever is in full depressed position, is shown in Fig. 4. It may be explained at this time that the extent of ridge 22 is sufficient to preclude the return of latch 23 to the right hand side of ridge 22, except when lever 21 is depressed sufficiently far to effect setting of the shutter mechanism. However after lever 21 is fully depressed to set the shutter mechanism, its return to normal position, which must occur in any event before a second exposure is made, causes latch 23 to again drop into notch 28 to preclude further setting movement.

In most types of shutter mechanisms of this type, lever 21 remains in depressed position until the shutter is released by depressing lever 22, after which lever 21 returns to normal position. However in case lever 21 is returned to normal position before the shutter is released, either by manual force or by spring bias, the action of my invention is substantially the same, since locking of latch 23 prevents the taking of more than one exposure, until the latch has been released.

Assuming that an exposure has been made and that the lever 21 is now locked by latch 23, it is of course impossible for the operator to take a double exposure upon the same film portion, since the shutter mechanism cannot be set. Therefore it is necessary for the operator to first roll up the exposed portion of the film, by rotation of spindle 12, after which lever 21 can again be depressed to set the shutter mechanism, for taking another exposure.

It is evident that my invention can assume various specific forms. For example a guard can be employed in place of locking mechanism, as disclosed in my copending application, Serial No. 402,952, filed October 28, 1929, in which event the guard is automatically moved to a position to preclude more than one operation of lever 21 before the spindle 12 is rotated.

I claim:

1. Apparatus of the character described comprising a camera having a shutter mechanism and a winding spool rotatable for replacing an exposed film portion with an unexposed portion, a winding key for rotating said spool, said shutter mechanism having one lever movable from a normal to a second position to effect setting of the shutter mechanism and another lever independently movable to release the shutter mechanism to effect an exposure, locking means for rendering said shutter mechanism inoperable to effect a double exposure, said locking means comprising a spring latch adapted to engage said shutter setting lever, and a flexible motion transmitting device for releasing said spring latch in response to rotational movement of said winding key.

2. Apparatus of the character described comprising a camera having a shutter mechanism and a winding spool rotatable for replacing an exposed film portion with an unexposed portion, said shutter mechanism having one lever movable from a normal to a second position to effect setting of the shutter mechanism and another lever independently movable to release the shutter mechanism to effect an exposure, and locking means for rendering said shutter mechanism inoperable to effect a double exposure, said locking means comprising a spring latch adapted to engage said shutter setting lever, and a ridge on the shutter setting lever for holding the latch out of locking engagement with the lever and for guiding the latch into locking position when said lever is actuated.

3. Apparatus of the character described comprising a camera having a shutter mechanism and a winding spool rotatable for replacing an exposed film portion with an unexposed portion, a winding key for rotating said spool, said shutter mechanism having one lever movable from a normal to a second position to effect setting of the shutter mechanism and another lever independently movable to release the shutter mechanism to effect an exposure, and locking means for rendering said shutter mechanism inoperable to effect a double exposure, said locking means comprising a spring latch adapted to engage said shutter setting lever, a ridge on said shutter setting lever for guiding said latch into locking position and for maintaining said latch out of locking position after it has been released and means for releasing said latch actuated by rotational movement of said winding key.

4. Apparatus of the character described comprising a camera having a shutter mechanism and a winding spool rotatable for replacing an exposed film portion with an unexposed portion, a key for rotating said spool, said shutter mechanism having one lever movable from a normal to a second position to effect setting of the shutter mechanism and another lever independently movable to release the shutter mechanism to effect an exposure and locking means for rendering said shutter mechanism inoperable to effect a double exposure, said locking means comprising a spring latch adapted to engage said shutter setting lever, a flexible motion transmitting member operably communicating with said winding spool and said latch, said motion transmitting member being normally biased out of engagement with said latch and means for moving said motion transmitting member into engagement with said latch to release the same when said spool is rotated by said winding key.

5. Apparatus of the character described comprising a camera having a shutter mechanism and a winding spool rotatable for replacing an exposed film portion with an unexposed portion, a winding key for rotating said spool, said shutter mechanism having one lever movable from a normal to a second position to effect setting of the shutter mechanism and another lever independently movable to release the shutter mechanism to effect an exposure, and locking means for rendering said shutter mechanism inoperable to effect a double exposure, said locking means comprising a spring latch adapted to engage said shutter setting lever, a flexible motion transmitting member operably communicating with said winding spool and said latch, said motion transmitting member being normally biased out of engagement with said latch and means for applying a compressional force through said motion transmitting member upon rotational movement of said spool by said winding key to release said latch.

6. Apparatus of the character described comprising a camera having a shutter mechanism and a winding spool rotatable for replacing an exposed film portion with an unexposed portion, a winding key for rotating said spool, said shutter mechanism having one member movable to set said mechanism and another independently movable member for releasing the same to effect an exposure, and means for rendering said shutter mechanism setting member inoperable after each exposure, thereby precluding a double exposure on a given film portion, said means being automatically released by rotation of said winding key.

7. Apparatus of the character described comprising a camera having a shutter mechanism and a winding spool rotatable for replacing an exposed film portion with an unexposed portion, a winding key for rotating said spool, said shutter mechanism having one member movable to set said mechanism and another independently movable member for releasing the same to effect an exposure, and locking means for rendering said shutter mechanism setting member inoperable after each exposure, thereby precluding a double exposure on a given film portion, said means being automatically released by rotation of said winding key.

8. Apparatus of the character described comprising a camera having a shutter mechanism and a winding spool rotatable for replacing an exposed film portion with an unexposed portion, said shutter mechanism having one lever movable from a normal to a second position to set the shutter mechanism and another lever independently movable to release the shutter mechanism to effect an exposure, and means for rendering said shutter mechanism setting lever inoperable after each exposure, thereby precluding a double exposure, said means including means for locking said setting lever in normal position upon return of the same from said second position.

9. Apparatus of the character described comprising a camera having a shutter mechanism and a winding spool rotatable for replacing an exposed film portion with an unexposed portion, a winding key for rotating said spool, said shutter mechanism having one lever movable from a normal to a second position to set the shutter mechanism and another lever independently movable to release the shutter mechanism to effect an exposure, and locking means for rendering said shutter mechanism setting lever inoperable after each exposure, thereby precluding a double exposure, and means including a flexible motion transmitting device operably connecting said key and the shutter mechanism for releasing said locking means upon rotation of said key.

10. Apparatus of the character described comprising a camera having a shutter mechanism and a winding spool rotatable for replacing an exposed film portion with an unexposed portion, a winding key for rotating said spool, said shutter mechanism having one lever movable from a normal to a second position to set the shutter mechanism and another lever independently movable to release the shutter mechanism to effect an exposure, and means for rendering said shutter mechanism setting lever inoperable after each exposure, thereby precluding a double exposure, said means including a flexible motion transmitting device operably connecting said key and the shutter mechanism setting lever and locking means serving to lock said first lever in normal position, said locking means being released by said motion transmitting device upon rotation of said winding key.

In testimony whereof, I have hereunto set my hand.

WINSOR JOSSELYN.